United States Patent
Ross et al.

(10) Patent No.: US 8,239,342 B2
(45) Date of Patent: Aug. 7, 2012

(54) METHOD AND APPARATUS FOR PROVIDING ON-DEMAND ONTOLOGY CREATION AND EXTENSION

(75) Inventors: Steven I. Ross, South Hamilton, MA (US); Daniel M. Gruen, Newton, MA (US); Susanne C. Hupfer, Lexington, MA (US); Nishanth R. Sastry, Cambridge, MA (US); John F. Patterson, Carlisle, MA (US)

(73) Assignee: International Business Machines Corporation, Armonk, NY (US)

( * ) Notice: Subject to any disclaimer, the term of this patent is extended or adjusted under 35 U.S.C. 154(b) by 928 days.

(21) Appl. No.: 11/867,890

(22) Filed: Oct. 5, 2007

(65) Prior Publication Data

US 2009/0094184 A1   Apr. 9, 2009

(51) Int. Cl.
*G06N 5/00*   (2006.01)
(52) U.S. Cl. ............................... 706/60; 706/45
(58) Field of Classification Search ............... 706/60, 706/45
See application file for complete search history.

(56) References Cited

U.S. PATENT DOCUMENTS

| | | | |
|---|---|---|---|
| 5,943,497 A * | 8/1999 | Bohrer et al. ............... 717/121 |
| 6,023,578 A | 2/2000 | Birsan et al. | |
| 6,108,635 A | 8/2000 | Herren et al. | |
| 6,609,132 B1 | 8/2003 | White et al. | |
| 6,691,134 B1 | 2/2004 | Babula et al. | |
| 7,130,861 B2 | 10/2006 | Bookman et al. | |
| 7,139,774 B2 | 11/2006 | Dettinger et al. | |
| 7,143,091 B2 | 11/2006 | Charnock et al. | |
| 7,240,330 B2 | 7/2007 | Fairweather | |
| 7,428,555 B2 | 9/2008 | Yan | |
| 7,707,159 B2 | 4/2010 | Christianson et al. | |
| 2002/0059069 A1 | 5/2002 | Hsu et al. | |
| 2003/0101151 A1 | 5/2003 | Holland | |
| 2004/0139107 A1 | 7/2004 | Bachman et al. | |
| 2004/0220893 A1 | 11/2004 | Spivack et al. | |
| 2007/0088723 A1 | 4/2007 | Fish | |
| 2008/0154873 A1 | 6/2008 | Redlich et al. | |
| 2008/0162498 A1 | 7/2008 | Omoigui | |
| 2009/0158099 A1 | 6/2009 | Cui | |
| 2009/0248753 A1 | 10/2009 | Tsai et al. | |

* cited by examiner

*Primary Examiner* — Wilbert L Starks

(74) *Attorney, Agent, or Firm* — Hamilton, Brook, Smith & Reynolds, P.C.

(57) ABSTRACT

A computer system and method providing on-demand extension of ontology in an ontology use process. A support module responds to a creation event in the ontology use process. The support module defines ontology specification for a newly created item, in the creation event, in a manner substantially free of disruption or interruption to the ontology use process. An ontology manager incorporates the defined ontology specification into the ontology during the ontology use process such that an on-demand extension of the ontology results. One example ontology use process is semantic modeling of situations, organizations, or objects of interest. Modeling and ontology specification take place hand in hand, and the ontology is extended on an as-needed and on-demand fashion during the course of modeling.

19 Claims, 7 Drawing Sheets

METHOD AND APPARATUS FOR PROVIDING ON-DEMAND ONTOLOGY CREATION AND EXTENSION

GOVERNMENT SUPPORT

The invention was made with Government support, in whole or in part, under Contract no. TIA H98230-05-3-0001 awarded by the U.S. Department of Defense. The Government has certain rights to this invention.

BACKGROUND OF THE INVENTION

In semantic web and knowledge engineering applications, an ontology is used to define a hierarchy of concept classes in a domain, and the attributes and relationships that may exist on or between instances of those classes. Typically development of these ontologies is conducted separately from their use, but inevitably attempted use of the ontology uncovers inadequacies, such as missing classes or relationships. So a workflow involving a cycle of ontology modification and use is necessary. Existing work practices segregate ontology specification and modification either to different sections and/or commands of a tool from those involved in actual use of the ontology, or relegate ontology specification and maintenance to separate tools from those involved in ontology use.

SUMMARY OF THE INVENTION

The present invention addresses the foregoing shortcomings of the prior art. In particular, the present invention provides a collaborative reasoning method and system in which definition and use of ontologies is a more seamless process. The ontology can be created and extended in an on-demand fashion as it is being used. Ontology extension occurs on-demand as the user discovers inadequacies during the course of use. Instead of being a separate activity, ontology evolution occurs as an integral part of the ontology use process.

In a preferred embodiment, computer apparatus extends ontology, on demand, in a working process and as a part of the working process. The embodiment includes a support module responsive to a creation event in the working process. The support module defines the ontology specification for a newly created item, in the creation event, in a manner being substantially part of the working process. An ontology manager incorporates the defined ontology specification into the subject ontology resulting in an extended ontology without disruption or interruption to the working process. For example, semantic modeling type working processes model situations, organizations or objects of interest. Modeling and ontology specification take place hand in hand, and the ontology is extended on an as-needed and on-demand fashion during the course of modeling.

Other embodiments provide a computer system, method and/or program product having the forgoing functions of the support module and ontology manager.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

A description of example embodiments of the invention follows.

In the present invention, users create graphical models of situations, organizations, or objects of interest. Textual or other representations of semantic models are also suitable. For simplicity of description of the principles of the present invention, graphical models are discussed and are for purposes of illustration not limitation.

The graphical models consist of nodes representing individual entities, and arcs representing relationships between them. The classification of the node types, and the labels specifying the relationships represented by the arcs are drawn from the ontology, while the particular nodes, the values of their attributes, and the specific relationships expressed with other nodes are specific to the model. In constructing models, users are given assistance to choose appropriate classes and relationships based on the existing ontology, but they are also permitted to go beyond the existing ontology and specify new classifications and relationships as needed. Additional information is collected about these terms, and the ontology is extended to include them. In this way, modeling and ontology specification take place hand-in-hand, and the ontology is extended on an as-needed and on-demand fashion during the course of modeling. FIGS. 1-3b are illustrative.

Figure 1:
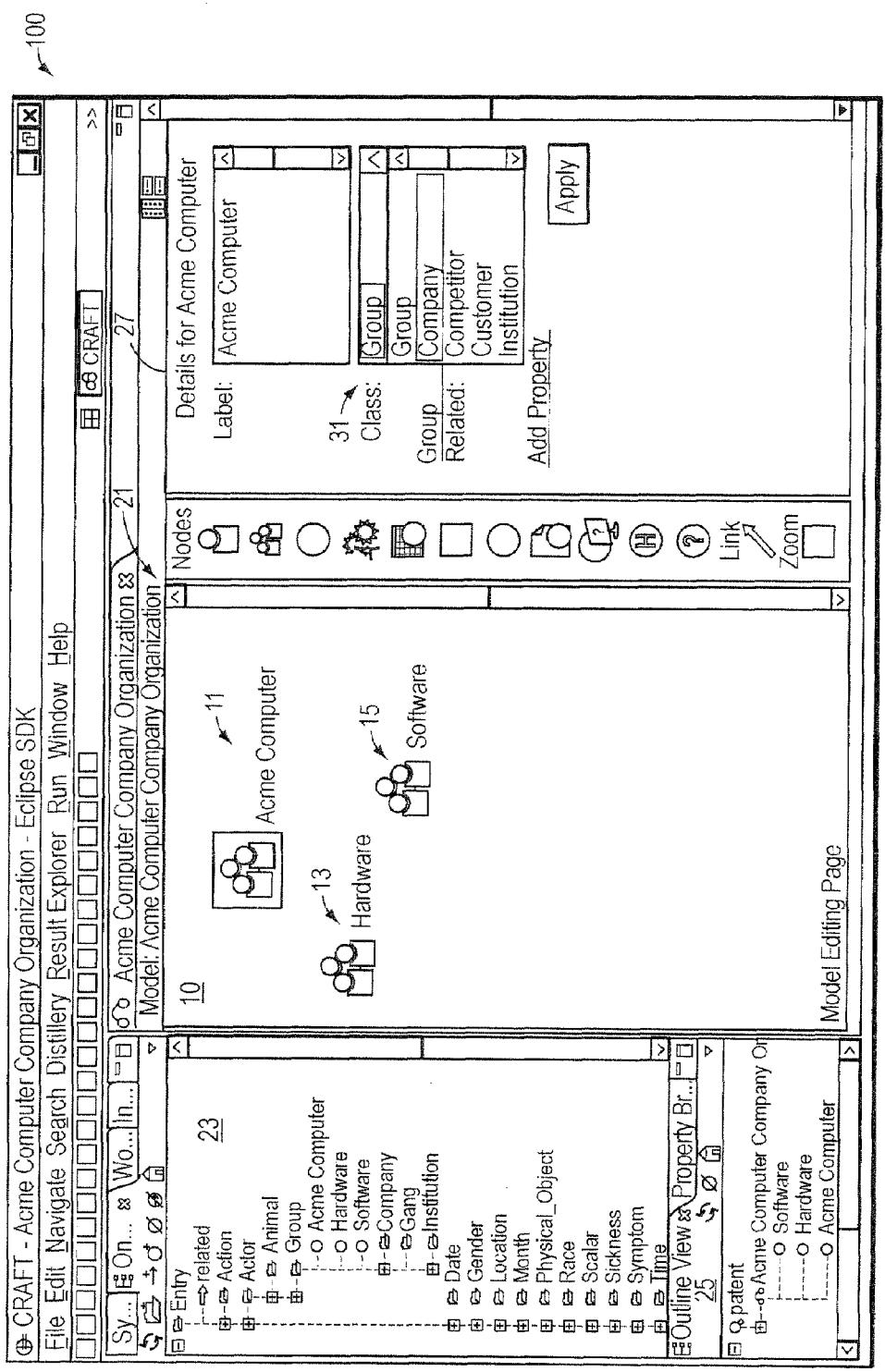
FIG. 1 is a screen view of a graphical modeling system embodying the present invention.

In FIG. 1, the invention tool (computer apparatus or system) 100 is show with the beginnings of model 10 of a particular company's organizational structure. The intention is to represent, using a respective nodes 11, 13, 15, a company called "Acme Computer" which consists of "Hardware" and "Software" divisions. The graphical model editor 21 is the middle pane, while on the left is a representation of the ontology 23 in the top pane and an outline view 25 of the current model in the bottom pane. To the right of the graphical model editor 21 is a details pane 27 listing detailed information for the currently selected object 11 in the editor 21, highlighted with a colored background in the editor pane. Initially categorized as a "group" (in Class field 31), the Acme Computer node 11 can simply be reclassified as a Company by the user choosing that classification offered up from the ontology module 23 based on the existing definition of a Company as a kind of group (shown highlighted in the middle of details pane 27 and in the ontology pane view 23).

Figure 2:
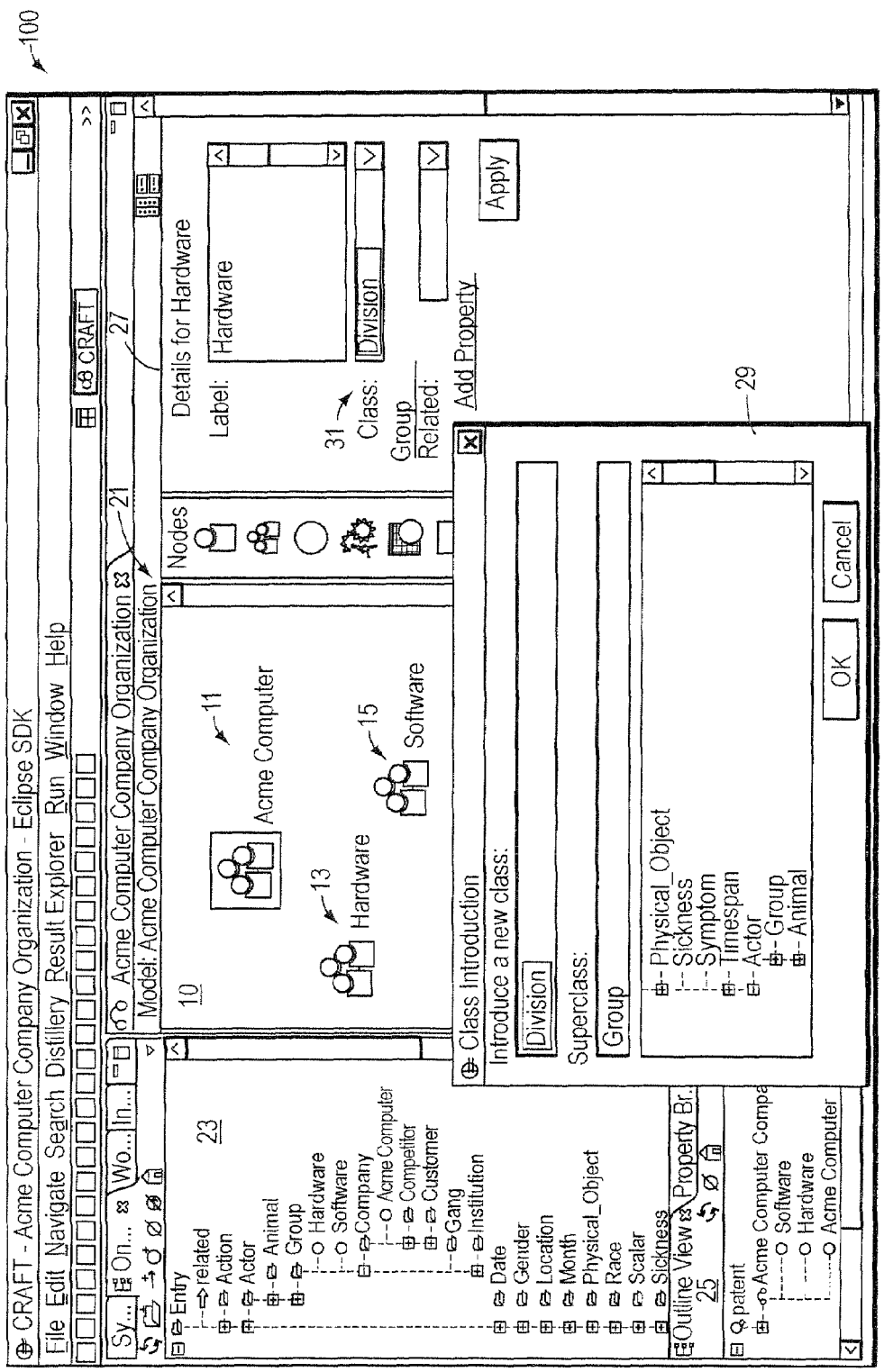
FIGS. 2-3b are further screen view illustrations of the present invention ontology specification as part of graphical modeling in the system of FIG. 1.

In FIG. 2 the hardware group 13 has been selected in working model 10 of editor 21 and the user wishes to categorize it as a division. The ontology module 23 does not (as yet) have a notion of an organizational division, so none of the suggested classifications for the Hardware Division will do. Instead, the invention system 100 enables the user to type the classification into the details member 27 for the Hardware Division, as illustrated in the Class field 31 of FIG. 2.

Once the user enters a new classification, system 100 responsively displays a dialog window 29 alerting the user that a new class is being defined. Through the displayed dialog 29, system 100 requests the user to specify superclass (es) so that the new class can be integrated into the existing ontology 23 and manifested by Class 31 and Group fields in details pane 27. The system 100 uses existing ontology 23 and automatically suggests a likely superclass based on the prior classification of the object 13. Once accepted by the user, invention system 100 incorporates the new class into the ontology 23, and the Hardware Division is classified as being a member of that class. When any user subsequently proceeds to reclassify the software division node 15, the "Division" class will be available in the classification field 31 pull down list of details pane 27 as supported by ontology 23 for use.

Figure 3A:
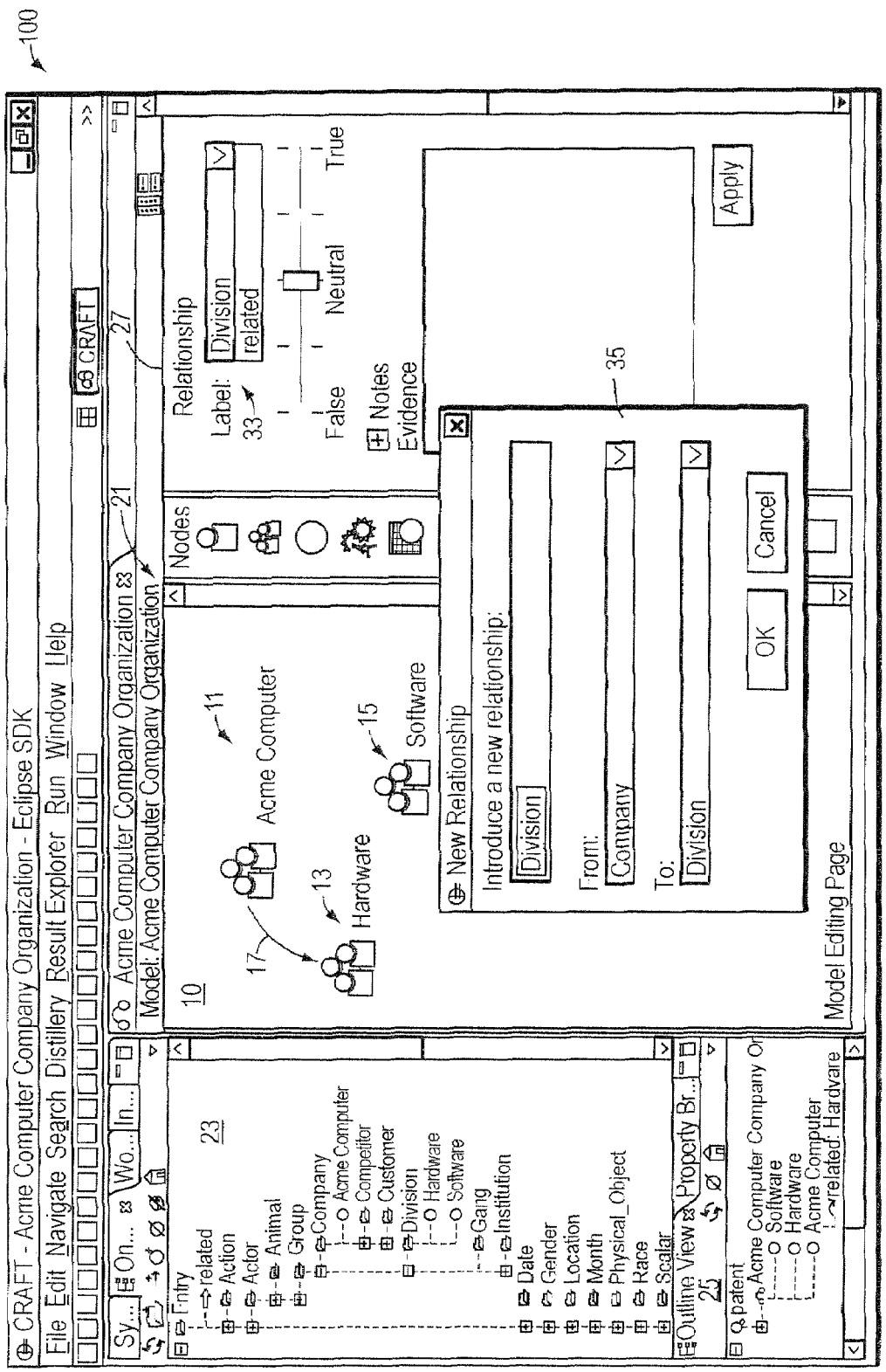
Figure 3B:
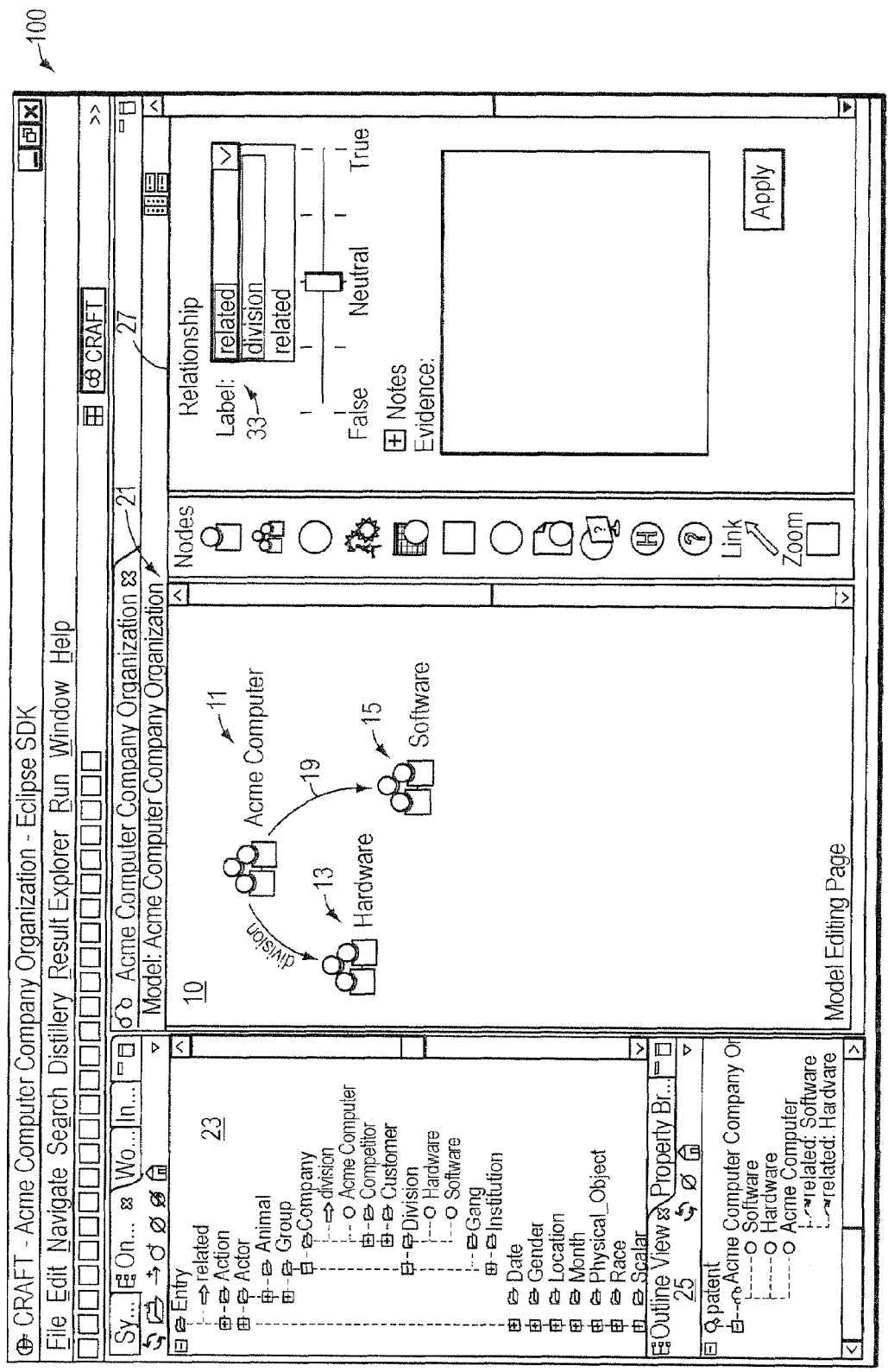

In FIG. 3*a*, the user next draws an arc 17 representing a relationship between the company node 11 and one of its division nodes 13. The user wishes to label the arc 17 with the proper relationship in using respective label field 33. First, the system 100 offers as options the relationships defined in the ontology 23 that would map between the classes of the source 11 and destination 13 nodes of the arc 17, but at present it finds only the default relationship of "related." The user enters or otherwise inputs (keys) the name of the "division" relationship in label field 33. Note that the division relationship is different from the "Division" class. It is a commonplace occurrence for relationships and classes to have the same name, such as a color relationship that maps to a member of the Color class.

Again system 100 is responsive and displays a confirmation dialog window 35 offering to add a new kind of relationship with the user given name. The confirmation dialog 35 further provides to the user an opportunity to modify the definitions of the associated source node 11 and destination node 13 classes for the new division relationship being added to the ontology. That is, the system's 100 default use of the classification of nodes 11 and 13 is only an initial guess for the definition of the new relationship, derived from the context of the arc 17 in the working or subject model 10.

Dialog 35 enables the user to reclassify the source node 11 and the destination node 13 respectively depending on the specificity of the relationship desired. The relationship itself has a domain and a range which represents the classes of nodes that an arc labeled with that relationship can originate and terminated at. System 100 uses the relationship details (classifications/reclassifications) entered by the user in dialog 35 to set or otherwise define the domain and range of the subject relationship.

Once accepted by the user, the system 100 adds the new relationship to the ontology 23 and the arc 17 is labeled with the newly specified relationship. The system 100 makes the relationship available for labelling the arc 19 to the other division node 15 as show in FIG. 3*b*. In particular, the ontology 23 view pane shows the "division" label with an arrow symbol in the Company folder hierarchy.

In this manner, the ontology 23 is extended as needed without significant interruption to the user's efforts to capture the knowledge that s/he wishes to represent. By contrast, an ontology editor such as Protégé (see "The Protété Ontology Editor and Knowledge Acquisition System" at protété.stanford.edu and Ernst, Neil, Storey, Margaret Ann, and Allen, Polly, "Cognitive Support for Ontology Modelling" at www-.neilernst.net/docs/pubs/ijhcs-protété.pdf) will allow users to define individual members of existing classes, but the only way to specify a new relationship between individuals is to navigate back to the ontology, add the property to the class, and then return to the individuals to assert the relationship.

Applicants approach and the present invention system 100 is much more natural and less disruptive to the modeling work in progress.

Figure 4:
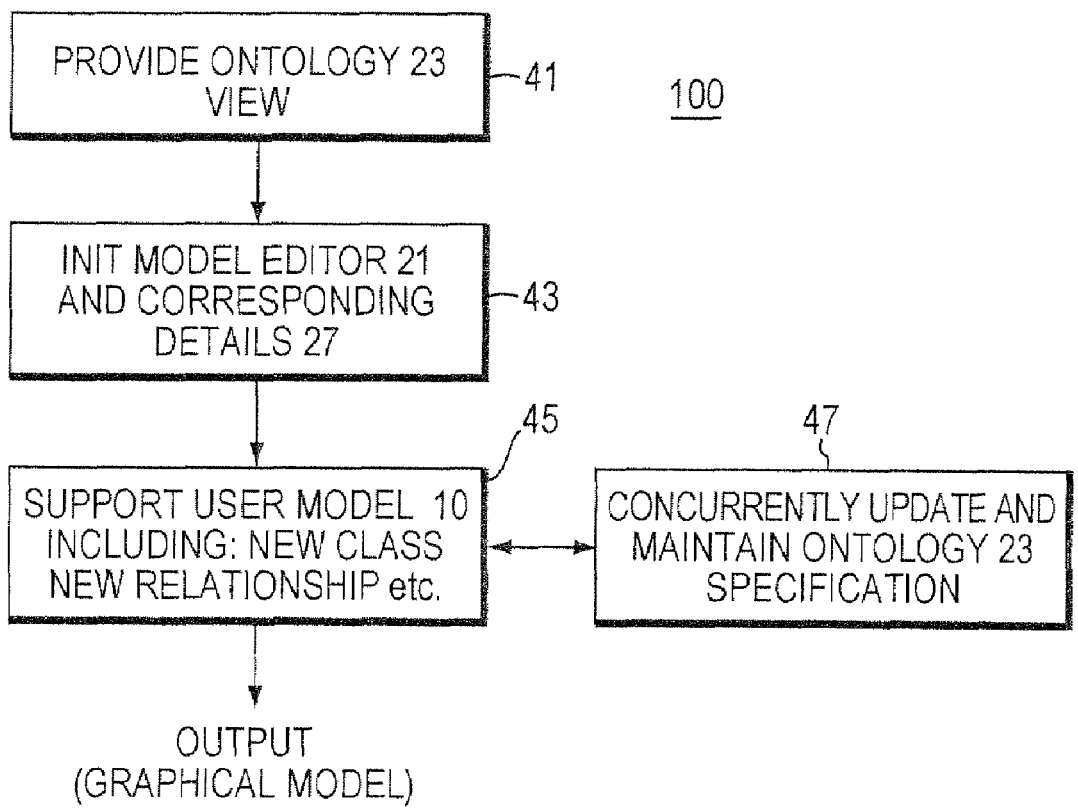
FIG. 4 is a flow diagram of one embodiment.

FIG. 4 outlines the invention system 100 program flow for one embodiment. At Step 41, system 100 provides an ontology 23. Supporting data structures may include tables, tree, linked lists and other data store techniques common in the art.

Step 43 initializes the model editor 21 and corresponding Details Module 27. In step 45, system 100 supports user interaction with model editor 21 in generating a desired graphical model 10. Step 45 thus includes displaying corresponding model parts information in details pane 27 in connection with user interaction with a subject model 10 in model editor 21. Common editor application techniques are used.

As well, step 45 is responsive to the user entering new classes and/or new relationship and the like as illustrated in FIGS. 2 and 3*a* discussed above. That is, step 45 provides dialog windows 29, 35 as pertinent. System 100 provides defaults for the dialog 29, 35 fields based on the current state of the ontology 23 supporting tables, trees, etc. After user input in those dialogs 29, 35, step 45 ports the user input to ontology 23 specifications by calling step 47 which serves as an ontology manager. In turn, step 47 (ontology manager) updates and maintains ontology 23 supporting tables, trees, etc. with the user entered new classes and relationships, etc. during (seamlessly with) operation of model editor 21. Restated, steps 45 and 47 of system 100 allow the user to use terms that were not previously defined (specified) in the ontology 23 and allows these terms to be defined on the fly (on-demand) after user introduction (use) in the modeling application environment. Such provides less disruption or interruption to the modeling work and generation of the desired graphical model 10.

In this way, ontology creation and extension is provided on-demand and operationally as part of the ontology use process (model editor 21 in the above example). As such the present invention ontology extension bypasses the separate ontology specification application and user operations thereof, and instead is a functional part of the ontology use process (e.g. model editor 21).

Figure 5:
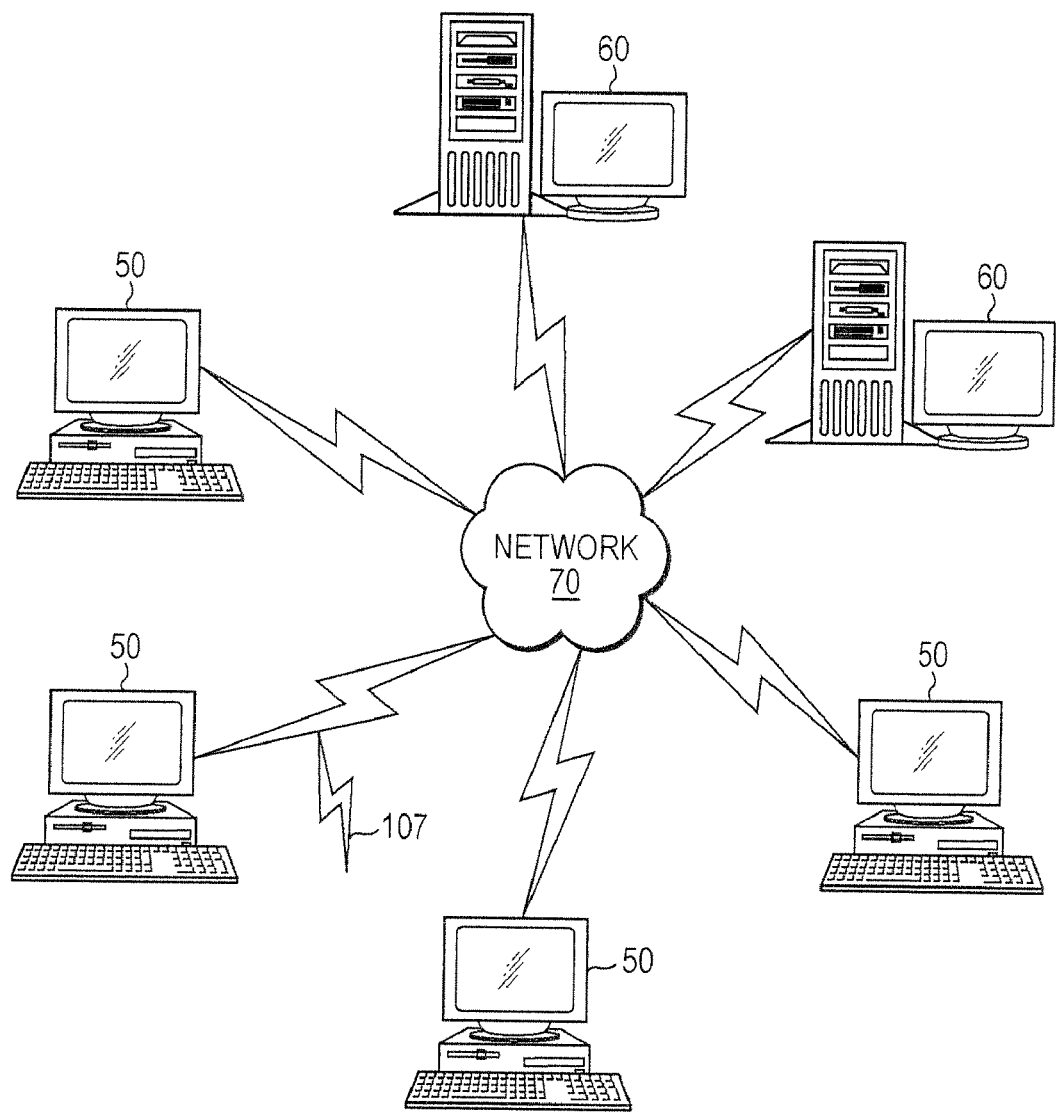
FIG. 5 illustrates a computer network or similar digital processing environment in which the present invention may be implemented.

FIG. 5 illustrates a computer network or similar digital processing environment in which the present invention may be implemented.

Client computer(s) 50 and server computer(s) 60 provide processing, storage, and input/output devices executing application programs and the like. Client computer(s) 50 can also be linked through communications network 70 to other computing devices, including other client devices/processes 50 and server computer(s) 60. Communications network 70 can be part of a remote access network, a global network (e.g., the Internet), a worldwide collection of computers, Local area or Wide area networks, and gateways that currently use respective protocols (TCP/IP, Bluetooth, etc.) to communicate with one another. Other electronic device/computer network architectures are suitable.

Figure 6:
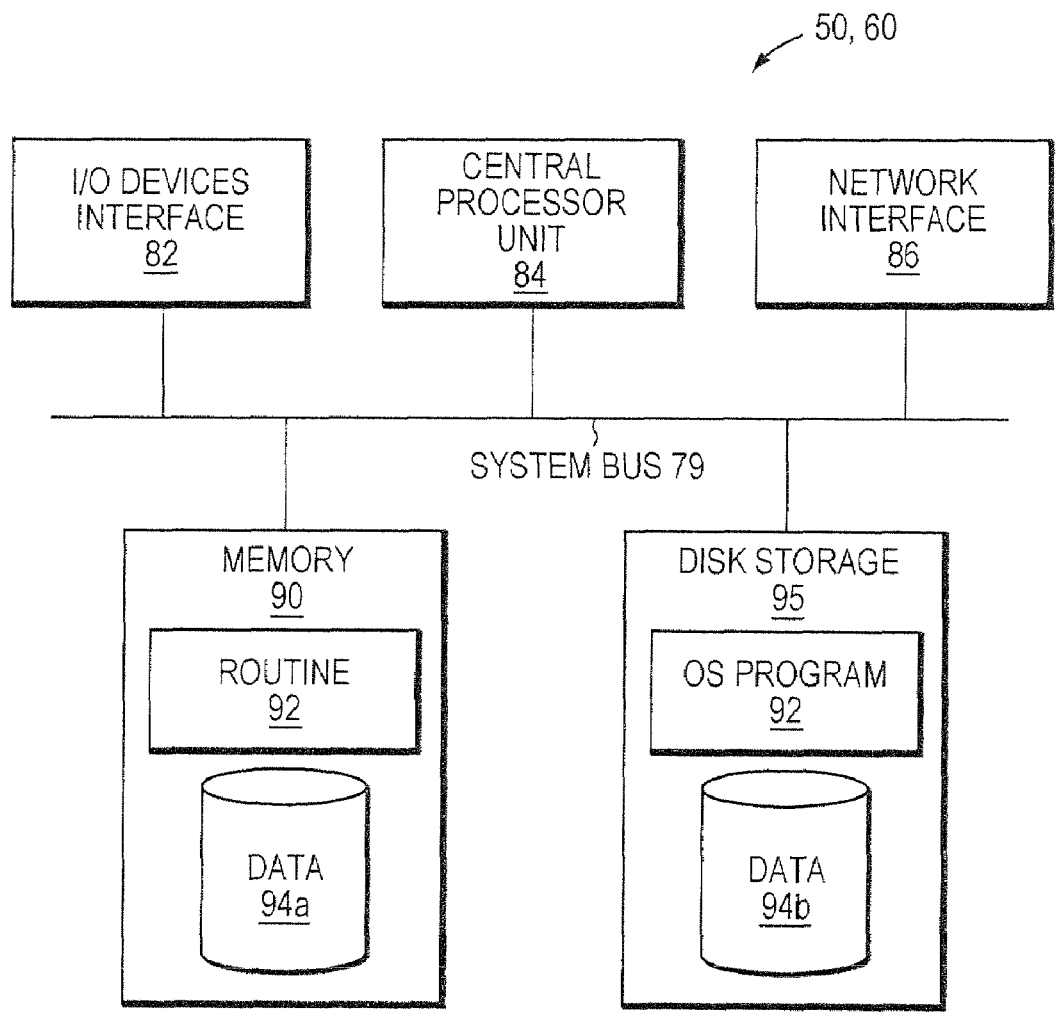
FIG. 6 is a diagram of the internal structure of a computer (e.g., client processor 50 or server computers 60) in the computer system of FIG. 5.

FIG. 6 is a diagram of the internal structure of a computer (e.g., client processor 50 or server computers 60) in the computer system of FIG. 5. Each computer 50, 60 contains system bus 79, where a bus is a set of hardware lines used for data transfer among the components of a computer or processing system. Bus 79 is essentially a shared conduit that connects different elements of a computer system (e.g., processor, disk storage, memory, input/output ports, network ports, etc.) that enables the transfer of information between the elements. Attached to system bus 79 is I/O device interface 82 for connecting various input and output devices (e.g., keyboard, mouse, displays, printers, speakers, etc.) to the computer 50, 60. Network interface 86 allows the computer to connect to various other devices attached to a network (e.g., network 70 of FIG. 5). Memory 90 provides volatile storage for computer software instructions 92 and data 94 used to implement an embodiment of the present invention (e.g., ontology manager 47, ontology 23 extension and modeling tool 10 detailed above in FIGS. 1-4). Disk storage 95 provides non-volatile storage for computer software instructions 92 and data 94 used to implement an embodiment of the present invention. Central processor unit 84 is also attached to system bus 79 and provides for the execution of computer instructions.

In one embodiment, the processor routines 92 and data 94 are a computer program product (generally referenced 92), including a computer readable medium (e.g., a removable storage medium such as one or more DVD-ROM's, CD-ROM's, diskettes, tapes, etc.) that provides at least a portion of the software instructions for the invention system. Computer program product 92 can be installed by any suitable software installation procedure, as is well known in the art. In another embodiment, at least a portion of the software instructions may also be downloaded over a cable, communication and/or wireless connection.

In other embodiments, the invention programs are a computer program propagated signal product 107 embodied on a propagated signal on a propagation medium (e.g., a radio wave, an infrared wave, a laser wave, a sound wave, or an electrical wave propagated over a global network such as the Internet, or other network(s)). Such carrier medium or signals provide at least a portion of the software instructions for the present invention routines/program 92.

In alternate embodiments, the propagated signal is an analog carrier wave or digital signal carried on the propagated medium. For example, the propagated signal may be a digitized signal propagated over a global network (e.g., the Internet), a telecommunications network, or other network. In one embodiment, the propagated signal is a signal that is transmitted over the propagation medium over a period of time, such as the instructions for a software application sent in packets over a network over a period of milliseconds, seconds, minutes, or longer. In another embodiment, the computer readable medium of computer program product 92 is a propagation medium that the computer system 50 may receive and read, such as by receiving the propagation medium and identifying a propagated signal embodied in the propagation medium, as described above for computer program propagated signal product.

Generally speaking, the term "carrier medium" or transient carrier encompasses the foregoing transient signals, propagated signals, propagated medium, storage medium and the like.

While this invention has been particularly shown and described with references to example embodiments thereof, it will be understood by those skilled in the art that various changes in form and details may be made therein without departing from the scope of the invention encompassed by the appended claims.

For example, the present invention may be implemented in a variety of computer architectures. The computer network of FIGS. 5 and 6 are for purposes of illustration and not limitation of the present invention.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

The present invention is applicable to any area where people need to do structured reasoning or investigations and represent their thoughts in a formal manner. The invention may be included in semantic web or knowledge representation editors or tooling, or in a business intelligence or analysis support package.

What is claimed is:

1. A method for semantic modeling ontology extension, comprising the computer implemented steps of:

using a computer, providing a semantic modeling type working process having one or more models modeling meaning of information including situations, said providing including providing an ontology defining a hierarchy of concept classes and relationships that may exist on instances of the classes in the models, wherein the models are any of a graphical representation and text representation;

using the computer, supporting a creation event in the working process, said supporting including defining ontology specification for a newly created item in the creation event, the defining being done as a part of the working process during modeling and thus in a manner free of substantial interruption to the working process; and incorporating by the computer the defined ontology specification into the provided ontology resulting in an extended ontology on-demand and as needed during modeling.

2. A method as claimed in claim 1 wherein the semantic modeling type working process is any of a semantic web process, a knowledge representation editor, a user interactive design tool, a modeling tool, a business intelligence package and an analysis support package.

3. A method as claimed in claim 1 wherein the newly created item in the creation event is a new class.

4. A method as claimed in claim 3 further comprising the step of defining specifications of superclasses for the new class.

5. A method as claimed in claim 1 wherein the newly created item in the creation event is a new relationship.

6. A method as claimed in claim 5 further comprising the step of:

enabling user modification of default classification of source node and destination node of the new relationship.

7. Computer apparatus for creating and extending ontology in semantic modeling, comprising:

a support module executed by a computer and responsive to a creation event in a semantic modeling type working process having one or more models modeling meaning of information and situations, the support module defining ontology specification for a newly created item, in the creation event, in a manner being substantially part of the working process during modeling, wherein the models are any of a graphical representation and text representation; and an ontology manager executed by a computer and incorporating the defined ontology specification into an ontology resulting in one of a created ontology and an extended ontology on-demand and as needed during modeling, the ontology defining a hierarchy of concept classes and relationships that may exist on instances of the classes in the models.

8. Computer apparatus as claimed in claim 7 wherein the semantic modeling type working process is any of a semantic web process, a knowledge representation editor, a user interactive design tool, a modeling tool, a business intelligence package and an analysis support package.

9. Computer apparatus as claimed in claim 7 wherein the newly created item in the creation event is a new class.

10. Computer apparatus as claimed in claim 9 wherein the support module further prompts user specification of superclass for the new class.

11. Computer apparatus as claimed in claim 7 wherein the newly created item in the creation event is a new relationship.

12. Computer apparatus as claimed in claim 11 wherein the support module further enables user modification of default classification of source node and destination node of the new relationship.

13. Computer apparatus as claimed in claim 7 further comprising a subject ontology in the working process; and the ontology manager incorporates the defined ontology specification into the subject ontology resulting in an extended ontology.

14. A computer system providing on-demand creation and extension of ontology, in an ontology use process, comprising:

support means for responding to a creation event in the ontology use process, the support means defining ontology specification for a newly created item, in the creation event, in a manner substantially free of disruption to the ontology use process, the ontology use process having one or more semantic models modeling meaning of information and situations, wherein the models are any of a graphical representation and text representation; and incorporation means for incorporating the defined ontology specification into an ontology as needed during the ontology use process such that an on-demand extension of the ontology results, the ontology defining a hierarchy of concept classes and relationships that may exist on instances of the classes in the models.

15. A computer system as claimed in claim 14 wherein the ontology use process is any of a semantic web process, a knowledge representation editor, a user interactive design tool, a modeling too, a business intelligence package and an analysis support package.

16. A computer system as claimed in claim 14 wherein using the defined ontology specification, the incorporation means creates an ontology on-demand.

17. A computer program product comprising:

a computer useable storage medium having a computer readable program, wherein the computer readable program when executed by a computer causes the computer to:

support a creation event in a semantic modeling type working process having one or more models modeling meaning of information and situations, wherein the models are any of a graphical representation and a text representation, and said supporting the creation event including defining ontology specification for a newly created item in the creation event, the defining being done as a part of the working process during modeling and thus in a manner free of substantial interruption to the working process; and incorporate the defined ontology specification into an ontology resulting in one of an extended ontology and a created ontology on-demand and as needed during modeling, the ontology defining a hierarchy of concept classes and relationships that may exist on instances of the classes in the models.

18. A computer program as claimed in claim 17 wherein the computer readable program provides an ontology in the working process; and incorporates the defined ontology specification into the provided ontology resulting in the extended ontology.

19. A computer program product as claimed in claim 17 wherein the working process is any of a semantic web process, a knowledge representation editor, a user interactive design tool, a modeling too, a business intelligence package and an analysis support package.

* * * * *